US011790168B2

(12) United States Patent
Yoo et al.

(10) Patent No.: US 11,790,168 B2
(45) Date of Patent: Oct. 17, 2023

(54) NATURAL LANGUAGE AND MESSAGING SYSTEM INTEGRATED GROUP ASSISTANT

(71) Applicant: NCR Corporation, Atlanta, GA (US)

(72) Inventors: Thomas Siyong Yoo, Duluth, GA (US); Isaac Khai Ren Chua, Acworth, GA (US); Paul Hansa, Alpharetta, GA (US); Jinyong Jeong, Sandy Springs, GA (US)

(73) Assignee: NCR Corporation, Atlanta, GA (US)

( * ) Notice: Subject to any disclaimer, the term of this patent is extended or adjusted under 35 U.S.C. 154(b) by 164 days.

(21) Appl. No.: 17/162,178

(22) Filed: Jan. 29, 2021

(65) Prior Publication Data
US 2022/0245338 A1   Aug. 4, 2022

(51) Int. Cl.
*G06F 17/10*      (2006.01)
*G06F 40/279*     (2020.01)
(Continued)

(52) U.S. Cl.
CPC .............. *G06F 40/279* (2020.01); *G06F 7/08* (2013.01); *G06F 16/24578* (2019.01);
(Continued)

(58) Field of Classification Search
CPC ................. G06F 40/279; G06F 40/103; G06F 16/24578; G06F 7/08; G06Q 30/0631; H04L 12/1813; H04L 51/046; H04L 51/02
See application file for complete search history.

(56) References Cited

U.S. PATENT DOCUMENTS 6,023,697 A * 2/2000 Bates ................ G06F 16/24522
                                               707/999.102
7,693,720 B2 * 4/2010 Kennewick ......... G06F 16/3329
                                                    704/270.1
(Continued)

FOREIGN PATENT DOCUMENTS

AU       2008100545 A4 * 7/2008
CN        112015852 A  * 12/2020 ............. G06F 16/31
(Continued)

OTHER PUBLICATIONS

Loh, "Recommendation of complementary material during chat discussions," Knowledge Management & E-Learning: An International Journal 2.4 (Year: 2010).*

*Primary Examiner* — Shahid K Khan (74) *Attorney, Agent, or Firm* — Schwegman Lundberg & Woessner, P.A.

(57) ABSTRACT

A natural language and messaging system integrated group assistant (assistant) is provided. The assistant is designated as an active participant within a group chat session on a given messaging platform. The assistant actively engages the group discussion around a decision on a given subject to define the subject's context. Once the context is defined, the assistant performs out-of-band searches to satisfy group criteria for a decision on the subject and provides results back to the group within a natural language written response. Group members vote on alternatives provided in the results and the assistant tabulates the votes to identify a specific decision and the assistant provides detailed information to the group on the specific decision within a natural language summary message.

11 Claims, 3 Drawing Sheets

(51) Int. Cl.
*G06F 40/103* (2020.01)
*H04L 51/046* (2022.01)
*G06F 16/2457* (2019.01)
*G06F 7/08* (2006.01)
*G06Q 30/0601* (2023.01)
*H04L 12/18* (2006.01)
*H04L 51/02* (2022.01)

(52) U.S. Cl.
CPC ....... *G06F 40/103* (2020.01); *G06Q 30/0631* (2013.01); *H04L 12/1813* (2013.01); *H04L 51/046* (2013.01); *H04L 51/02* (2013.01)

(56) References Cited

U.S. PATENT DOCUMENTS

| | | | | |
|---|---|---|---|---|
| 8,155,280 | B1* | 4/2012 | Or-Bach | H04M 3/493 379/88.13 |
| 9,836,448 | B2* | 12/2017 | Tiitola | G06F 40/274 |
| 10,692,006 | B1* | 6/2020 | Zhang | G06N 3/08 |
| 10,708,216 | B1* | 7/2020 | Rao | H04L 51/52 |
| 11,205,147 | B1* | 12/2021 | Anderson | G06F 16/951 |
| 11,552,803 | B1* | 1/2023 | Simkhada | H04L 9/0894 |
| 2002/0103695 | A1* | 8/2002 | Urken | G06Q 30/02 705/12 |
| 2002/0156668 | A1* | 10/2002 | Morrow | G06Q 10/10 705/7.14 |
| 2005/0050151 | A1* | 3/2005 | Mitchell | G06Q 10/107 709/204 |
| 2008/0065507 | A1* | 3/2008 | Morrison | H04N 21/235 705/27.1 |
| 2008/0294448 | A1* | 11/2008 | Holtzclaw | G06Q 30/02 705/14.4 |
| 2014/0109046 | A1* | 4/2014 | Hirsch | G06F 8/70 717/120 |
| 2014/0122083 | A1* | 5/2014 | Xiaojiang | H04L 51/02 704/270.1 |
| 2014/0149107 | A1* | 5/2014 | Schilder | G06F 40/56 704/9 |
| 2015/0248651 | A1* | 9/2015 | Akutagawa | G06F 16/2465 705/7.19 |
| 2015/0356468 | A1* | 12/2015 | Cummins | G06Q 10/02 705/5 |
| 2016/0054915 | A1* | 2/2016 | Lynch | G06F 3/04842 715/765 |
| 2016/0134568 | A1* | 5/2016 | Woo | G06F 3/0484 709/206 |
| 2016/0180325 | A1* | 6/2016 | Davis | G06Q 20/40 705/44 |
| 2016/0189246 | A1* | 6/2016 | Eldh | G06Q 30/0269 705/14.66 |
| 2016/0335683 | A1* | 11/2016 | Roberts | G06F 16/9535 |
| 2016/0378080 | A1* | 12/2016 | Uppala | G10L 15/22 700/275 |
| 2017/0180284 | A1* | 6/2017 | Smullen | H04L 69/14 |
| 2018/0143978 | A1* | 5/2018 | Chang | G06N 3/08 |
| 2018/0165468 | A1* | 6/2018 | Moon | H04W 12/084 |
| 2018/0301046 | A1* | 10/2018 | Nedivi | H04L 51/046 |
| 2018/0357096 | A1* | 12/2018 | McConnell | G06F 9/466 |
| 2018/0357609 | A1* | 12/2018 | Hwacinski | G06F 40/242 |
| 2018/0358006 | A1* | 12/2018 | McConnell | G06F 40/295 |
| 2018/0365212 | A1* | 12/2018 | Banerjee | H04L 51/02 |
| 2019/0035403 | A1* | 1/2019 | Ramasamy | G06F 3/167 |
| 2019/0158309 | A1* | 5/2019 | Park | H04L 12/2832 |
| 2019/0386949 | A1* | 12/2019 | Vennam | H04L 65/403 |
| 2020/0073982 | A1* | 3/2020 | Kolluri Venkata Sesha | G06F 11/3082 |
| 2020/0159997 | A1* | 5/2020 | Wu | G06N 5/022 |
| 2020/0226483 | A1* | 7/2020 | Bellamy | G16H 50/20 |
| 2020/0227025 | A1* | 7/2020 | DiMascio | G10L 15/22 |
| 2020/0242964 | A1* | 7/2020 | Wu | G06F 16/90332 |
| 2020/0244606 | A1* | 7/2020 | Rodriguez | G06F 16/24578 |
| 2020/0287856 | A1* | 9/2020 | Price | H04L 51/02 |
| 2021/0117893 | A1* | 4/2021 | Sohum | G06Q 30/0613 |
| 2022/0092441 | A1* | 3/2022 | Zhu | G16H 80/00 |

FOREIGN PATENT DOCUMENTS

| | | | | |
|---|---|---|---|---|
| WO | WO-2020159001 A1 * | 8/2020 | .......... | G06Q 20/389 |
| WO | WO-2020242596 A1 * | 12/2020 | .......... | G06F 16/31 |

* cited by examiner

NATURAL LANGUAGE AND MESSAGING SYSTEM INTEGRATED GROUP ASSISTANT

BACKGROUND

Technology has significantly evolved over the last decade. Today, a variety of companies offer voice-based assistants to consumers (e.g., Google® Home®, Apple® Siri®, Amazon® Echo®, etc.). These assistants provide answers to short and uncomplicated questions posed by the users by converting the user's voice to text, performing a text search, and communicating results of the search back to voice as output. The Assistants may also perform actions or routines based on voice instruction of the user by converting the user's voice command into text, identifying the command, and processing the command with the appropriate device/service (e.g., "turn my light on" translates to send an on command to a light or plug using that light's/plug's Application Programming Interface (API), etc.).

For the most part, these assistants are voice-based tools with few if any interfaces to these services being written-based or text-based. Moreover, existing assistants are often error prone when the user attempts to engage the voice assistant in a true conversation, even through many of these assistants assert that they are conversational. Furthermore, existing assistants were developed as an individualized tool for interaction with and assistance to a single individual, such that few if any existing assistant is available for teams or groups of individuals. Most individuals work and socialize with one another in teams or groups, such that the available assistants are of little value in environments where teams are needed.

Additionally, the existing assistants are largely based on a general spoken language and a general lexicon. That is, specialized speech and words associated with a specific topic are not covered with any significant detail, such that when these types of words are used, the assistants get the context of the question or the command incorrect and are unable to be of any real assistance to the user.

SUMMARY

In various embodiments, methods and a system for a natural language and messaging system integrated group assistant are presented.

According to an embodiment, a method for interacting with a natural language and messaging system integrated group assistant is provided. Specifically, and in one embodiment, a natural language message is identified which was sent to a group of participants within a messaging platform during a chat session. A subject of the natural-language message is determined. A determination is made as to whether there is a sufficient context for the subject. An out-of-band action is processed when there is the sufficient context. Results of processing the out-of-band action is obtained, and a natural language response is sent to the group over the messaging platform that provides at least a portion of the results in the response.

DETAILED DESCRIPTION

Figure 1:
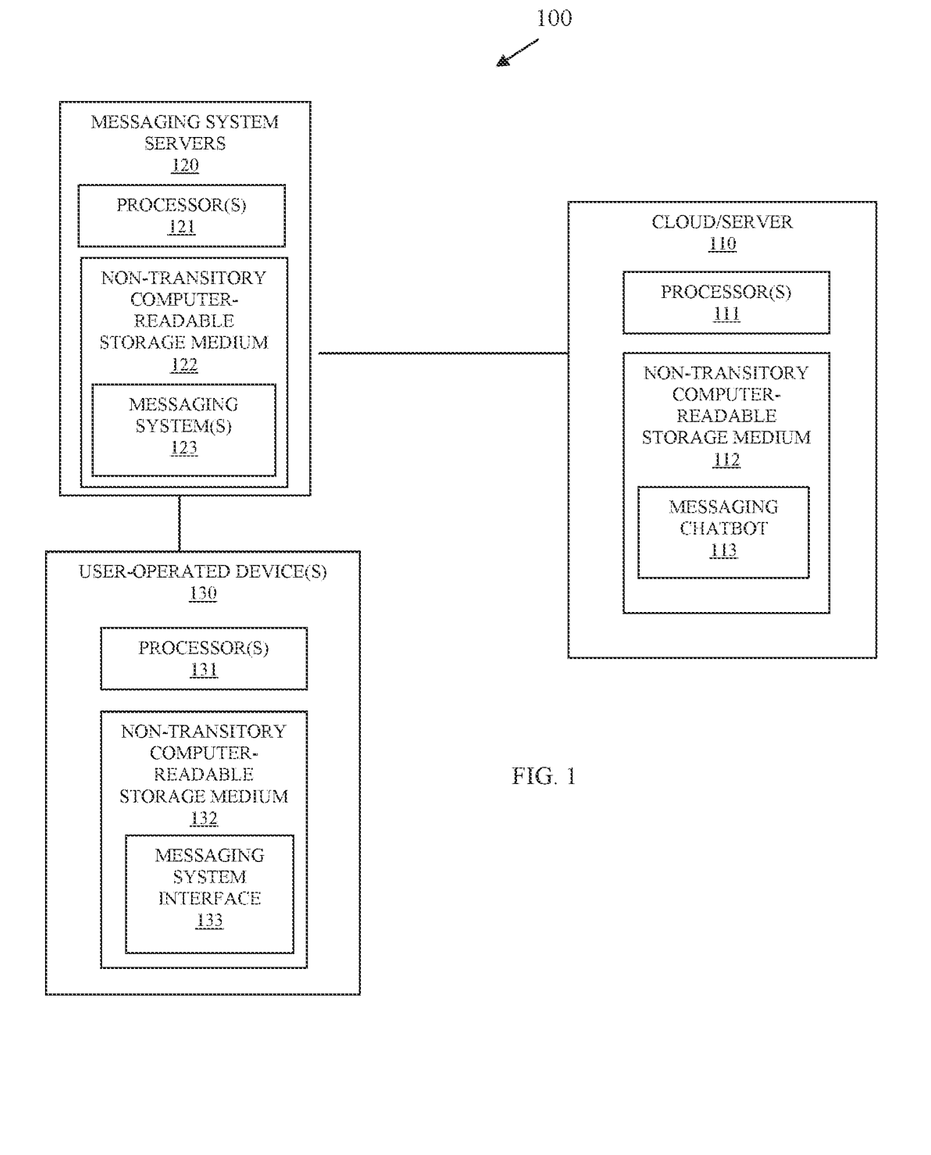
FIG. 1 is a diagram of a system for a natural language and messaging system integrated group assistant, according to an example embodiment.

FIG. 1 is a diagram of a system 100 for natural language and messaging system integrated group assistant, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the natural language and messaging system integrated group assistant presented herein and below.

Moreover, various components are implemented as one or more software modules, which reside in non-transitory storage and/or hardware memory as executable instructions that when executed by one or more hardware processors perform the processing discussed herein and below.

The techniques, methods, and systems presented herein and below for a natural language and messaging system integrated group assistant can be implemented in all, or some combination of the components shown within one or more hardware computing devices having one or more hardware processors.

The system 100 includes: a cloud/server 110, messaging system servers 120, and a plurality of user-operated devices 130.

Cloud/server 110 comprises one or more hardware processors 111 and a non-transitory computer-readable storage medium 112. Medium 112 comprises executable instructions for a messaging chatbot 113 (chatbot 113). When the executable instructions are provided to processor 111, this causes processor 111 to perform operations discussed herein and below for chatbot 113.

Each messaging system server 120 comprises one or more processors 121 and a non-transitory computer-readable storage medium 122. Medium 122 comprises executable instructions for a plurality of messaging services associated with the corresponding messaging system. When the executable instructions are provided to processor 121, this causes processor 121 to perform operations discussed herein and below for messaging systems 123.

Each user-operated device 130 comprises one or more processors 131 and a non-transitory computer readable storage medium 132. Medium 132 comprises executable instructions for a messaging system interface 133. When the executable instructions are provided to processor 131, this causes processor 131 to perform operations discussed herein and below for messaging systems 133.

As used herein, "messaging platform 123" may be used synonymously and interchangeably with "messaging system 123." These phrases refer to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, "chatbot 113" or "bot 113" refers to a software application that is designed to engage in messaging activities in an automated manner as an active participant within the messaging platforms 123. A bot 113 is a specific participant in a given chat session (messaging session or dialogue) associated with a group of other participants for any given messaging platform 123.

Chatbot 112 provides a natural language and messaging system integrated assistant to participants in a group written message chat session.

Chatbot 113 includes a front-end user facing interface that evaluates natural language written text in a given spoken and written language (human communication language) received as input into one or more actions that are processed by chatbot 113. Chatbot 113 takes output or results identified from any action processed and formulates a response therefrom into a coherent natural language written text communication message, which is then communicated by chatbot 113 over a given messaging platform 123 during a given group chat session to the participants (group) engaged in the group chat session.

To do this, chatbot 113 evaluates written messages of the chat session into subjects and actions. The subject and the action are processed by a back-end component of chatbot 113 to obtain a response/results that satisfy the subject based on the natural language written message received as input from the front-end user facing interface (interface that allows chatbot 113 to engage as an active participant in the chat session through the corresponding messaging platform 123). The back-end interface of chatbot 113 comprises a variety of Application Programming Interfaces (API) that allow chatbot 113 to access specific web-based resources accessible over the Internet and that allow chatbot 113 to search the web for results associated with the corresponding subjects of the chat messages.

For purposes of the various illustrations presented in the embodiment descriptions that follow, chatbot 113 is discussed within the context of a group chat session for a group of participants that are deciding on where the group should dine. It is noted that the purpose of the group or team discussions within a given chat session does not have to be with respect to dining out and can be any purpose and/or topic for which chatbot 113 was configured to recognize and assist the group in.

Initially, chatbot 113 is configured with a lexicon associated with discussion of a given topic. This means that the words and phrases used in written communications by groups of people (a group can comprise two or more individuals/participants) are weighted more heavily by chatbot 113 when listening to a group discussion for the configured topic than other words and phrases not associated with the topic. The topic may also comprise a lexicon that is used when discussing a topic, which is different than other lexicons not associated with the topic.

Most existing voice-based assistants are not configured to weight words and phrases differently based on the topic or to utilize a specialized lexicon from the topic; rather, existing voice-based assistants utilize words and phrases for a given spoken language as a whole. This means that existing assistants are not as precise when engaging in voice dialogues with users on some topics that the assistants are discussing with the users. This is not the case for purposes of the embodiments presented herein; chatbot 113 is customized for engaging a group of users in written messages during a chat session of a given messaging platform 123 on a given topic, such that chatbot 113 is precise in responses to the group during the chat session for the given topic.

Furthermore, existing assistants are configured to interact with a single user in single sentences and find it difficult to truly engage that single user in a true conversation; most available assistants cannot engage more than one individual at a time and will produce erroneous or no results when multiple individuals are conversing with the assistant. This is not the case herein; chatbot 113 is engaged as an active participant of a group within a chat session, maintains messages for each user in the group and can custom respond to specific users of the group within the chat session with the appropriate context.

Furthermore, since most group decisions on a given topic are not done based on one member's feedback during the group discussions, chatbot 113 provides a voting component to the chat session, which allows individuals to respond with their votes in making a decision for the topic. Chatbot 113 tabulates the votes and provides a vote-based decision to the group within the chat session. Once a decision of the group on the topic is reached, chatbot 113 can send a summary of the decision and more detailed and precise information associated with the decision (such as hypertext links to websites or web-based services, a summary of information gleaned from the websites or services, etc.).

Chatbot 113 is activated as a chat session participant by being affirmatively included using a chatbot messaging platform user identifier. That is, from the perspective of the messaging platform 123, chatbot 113 is just another user having a specific user identifier and account with the messaging services offered by the messaging platform 123. The messaging platform 123 may also allow for discussions to take place by tagging specific messages sent messaging platform user identifiers. In this case, any message or set of messages for which chatbot 113 is desired, at least one participant other than chatbot 113 provides at least one message within the chat session that includes the messaging platform user identifier for chatbot 113.

Once included in group discussions, chatbot 113 receives through the corresponding messaging platform 123 messages in written natural language. The messages are parsed for participant identifiers (messaging platform identifiers for the other participants in the messages), identifies the sending/posting participant, and evaluates the message for a subject or an intention of the message. The intention is based on the given topic and allows chatbot 113 to identify actions based on the intention of the topic.

For example, the topic may be dining out as a group and the message that tagged or included the chatbot's user identifier may have been written by Thomas within a group consisting of Thomas, Isaac, Paul, Jin, and chatbot 113. The written message may have stated Thomas "I want some good hot and sour soup for lunch does anyone have any suggestions?" The topic is lunch, the intention is somewhere with good hot and sour soup. When this is received by chatbot 113, chatbot 113 may lack the context as to where Thomas, Isaac, Paul, and Jin are located geographically and needs that context for resolving names of restaurants with hot and sour soup available on the menu. Accordingly, chatbot generates a natural language written message as "what zip code or city do you want to dine, how far are you willing to travel, and where are you presently located?" One of the participants may respond with "we want to dine in Atlanta within 2 miles of 100 Peachtree Street." Once this context is known, chatbot 113 uses its backend APIs to search the Internet for "restaurants near 100 Peachtree Street Atlanta Ga. with hot and sour soup." The search results are filtered to inspect just those restaurants within 2 miles of 100 Peachtree Street, links to the websites of the remaining restaurants and information obtained from those links are culled from the websites to summarize each result. Chatbot then formulates a natural language message as "I found 3 restaurants that satisfy the group request" along with links to each of the menus for each of the restaurants and the addresses, phone numbers, and hours of operation for each restaurant. The response message is sent to the group through the messaging platform 123 being used for the chat session. Chatbot may also ask in the response message for members of the group to vote by responding with a number that corresponds to the 3 restaurants. Thomas responds with a number 1 for the first restaurant listed, Isaac also responds with the number 1, Thomas responds with the number 3, and Jin responds with the number 2. Chatbot tabulates the votes and responds in the chat session to the group with the vote tally along with more detailed information for the restaurant that corresponding to the number 1, such as web reviews, a directions link, a pinned location on a map that can be activated by each participant from their phones to get individual directions from each of their current locations to the restaurant, etc.

It is also noted that each member of the group may have different requirements that they would like to see with respect to a decision of the group on the topic. Chatbot 113 notes and maintains these criteria for the group as a whole and attempts to satisfy all the criteria. In this way, a group discussion on a topic within a chat session can have many messages with different participants levying their own criteria so much so that keeping track of them all can be very difficult. Chatbot 113 ensures that all the criteria all included and considered in the group's final decision for the topic. Moreover, participants or members of the group vote when a final decision is made on the topic and chatbot 113 provides the winning vote back to the group.

In an embodiment, chatbot 113 can be configured with security features for any given chat session and group of participants. For example, suppose Thomas set up the group and is designated as had sent the first message to the group. Thomas may be permitted to send chatbot 113 messages directly as commands to make the voting anonymous, such that when members vote they only directed the votes to chatbot 113 (private message within the messaging platform). Chatbot 113 provides the vote totals to the group but does not provide a summary of how each member of the group voted. Other security rules can be set as well through private messages sent directly to Chatbot 113 with statements that Chatbot 113 is preconfigured to recognize as configuration and security for a given group or a given thread associated with a chat session.

In an embodiment, roles of the group members can also be defined through the group chat and directed to chatbot 113 (private messaging is not required here). For example, Thomas may indicate that Isaac gets to select the restaurant if Paul does not object. Chatbot 113 will message Paul after Thomas indicates he wants to go restaurant number 2 on the list and ask Paul if 2 is acceptable before sending the final decision to the group.

In an embodiment, chatbot 113 may have no way of knowing whether a particular participant is abstaining from the vote on a decision of the group or whether any participant is without a network connection or power for purposes of voting. Thus, chatbot 113 is configured by default to set a time for votes being casted by the group, when the time expires chatbot 113 sends a natural-language vote summary to the group along with the alternative that received the highest vote count during the voting. In an embodiment, the default time duration for the vote can be custom set for a group-defined time duration via private messages or based on group message of the group during the chat session.

Chatbot 113 is flexible and designed around teams/groups and how teams and groups interact with one another, define roles with one another within the group, and make group-based decisions that are voted on by the group. Chatbot 113 is an active participant who is affirmatively included (via the chatbot's messaging platform user identifier) in group chat sessions and engages the participants in natural language messages to define a context of a topic for which the group is making a decision, finds available information that meets the criteria of the group in making a final decision on the topic, allows the participants of the group to vote on the available information, and provides more detailed information to the group for the final decision and its corresponding information based on the vote totals.

In an embodiment, chatbot 113 comprises a modular set of software programs for identifying and analyzing received messages through the messaging platform 113, translating the natural language messages into API calls to web services, parsing results from the web services, formulating the results into natural language responses and presentations sent back to a group during a chat session, and tabulating participant votes on a decision.

During a chat session, chatbot maintains a state of the decision making and criteria associated with that state, such that should the group chat session on the designated decision for a designated topic span serval days or weeks, the chat session can pick right up where it left off with chatbot 113 fully configured for assisting in the decision of the group.

Further, each group chat session initiates an instance of chatbot 113 on cloud/server 110, such that chatbot 113 can handle many different group chat sessions at a time because each group chat session is using its own individual instance of chatbot 113.

In an embodiment, the messaging system interface 133 is a native interface provided by the messaging platform. This can be mobile application based, can be web-browser based, or can be a combination of both.

Chatbot 113 uses a native messaging system/platform interface when interacting with the messaging platform 123. The can comprises an API published and provided by the messaging system/platform 123.

The embodiments of FIG. 1 and other embodiments are now discussed with reference to the FIGS. 2-3.

Figure 2:
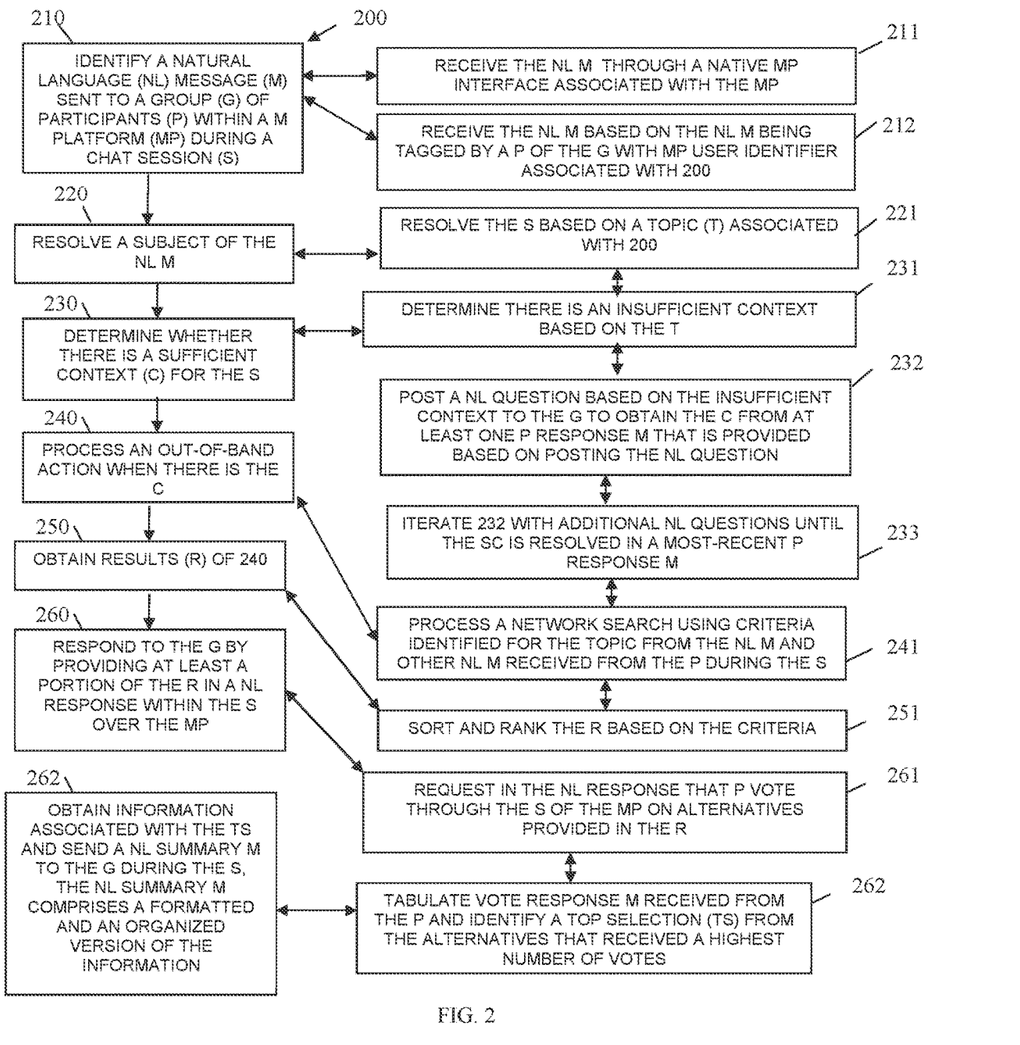
FIG. 2 is a diagram of a method for interacting with a natural language and messaging system integrated group assistant, according to an example embodiment.

FIG. 2 is a diagram of a method 200 for interacting with a natural language and messaging system integrated group assistant, according to an example embodiment. The software module(s) that implements the method 200 is referred to as a "chatbot." The chatbot is implemented as executable instructions programmed and residing within memory and/or a non-transitory computer-readable (processor-readable) storage medium and executed by one or more hardware processors of one or more hardware computing devices. The processors of the devices that execute the chatbot are specifically configured and programmed to process the chatbot. The chatbot has access to one or more networks during its processing. The networks can be wired, wireless, or a combination of wired and wireless.

In an embodiment, the device that executes the chatbot is a cloud/server 110. In an embodiment the device that executes the chatbot is a server 110. In an embodiment, a plurality of servers cooperate to execute the chatbot from one logical cloud server 110.

In an embodiment, the chatbot is chatbot 113 discussed above with system 100.

At 210, the chatbot identifies a natural-language message sent to a group of participants within a messaging platform during a chat session that the group is engaged in through a native messaging platform interface of the messaging platform.

In an embodiment, at 211, the chatbot receives the natural-language message through the native messaging platform interface associated with the messaging platform.

In an embodiment, at 212, the chatbot receives the natural-language message based on the natural-language message being tagged by a participant of the group with a messaging-platform identifier associated with the chatbot (method 200).

At 220, the chatbot resolves a subject of the natural-language message.

In an embodiment, at 221, the chatbot resolves the subject based on a topic associated with the chatbot (e.g., the chatbot preconfigure with words and lexicons that is specific to the topic (such as dining recommendations, merchandise recommendations, etc.).

At 230, the chatbot determines whether there is sufficient context for the subject. The natural-language message may be scored by the chatbot for needed information for the subject, such as location information, price information, etc. The score when compared against a threshold may indicate that the chatbot needs to obtain additional information from the group with respect to the condition associated with the score threshold. This allows the chatbot to determine when there is sufficient context or not sufficient context (insufficient context) for the subject.

In an embodiment of 221 and 230, at 231, the chatbot determines there is insufficient context based on the topic. For example, if the topic is dining recommendations than the context needs to include a geographical restriction, maybe a price restriction, cousin restriction, etc.

In an embodiment of 231 and at 232, the chatbot posts a natural-language question based on the insufficient context to the group in order to obtain the sufficient context from at least one of the participant response, which is provided based on posting the natural-language question.

In an embodiment of 232 and at 233, the chatbot iterates back to 232 with additional natural-language questions until the sufficient context is resolved in a most-recent participant response message.

At 240, the chatbot processes an out-of-band action when there is sufficient context. For example, the chatbot uses an API to perform a search or to contact a network resources where information about the subject may be obtained.

In an embodiment of 233 and 240, at 241, the chatbot processes a network search using criteria identified for the topic and the subject from the natural-language message and other natural-language messages received from the participants during the chat session.

At 250, the chatbot obtains results from processing the action at 240.

In an embodiment of 241 and 250, at 251, the chatbot sorts and ranks the results based on the criteria.

At 260, the chatbot responds to the group by providing at least a portion of the results in a natural-language response within the chat session over the messaging platform.

In an embodiment, at 261, the chatbot requests in the natural-language response that the participants vote through the chat session of the messaging platform on alternatives provided in the results.

In an embodiment of 261 and at 262, the chatbot tabulates vote response messages received from the participants and identifies a top selection from the alternatives based on that alternative having a highest number of votes.

In an embodiment of 262 and at 263, the chatbot obtains information associated with the top selection and sends a natural-language summary message to the group during the chat session. The natural-language summary message comprises a formatted and an organized version of the information about the top selection.

Figure 3:
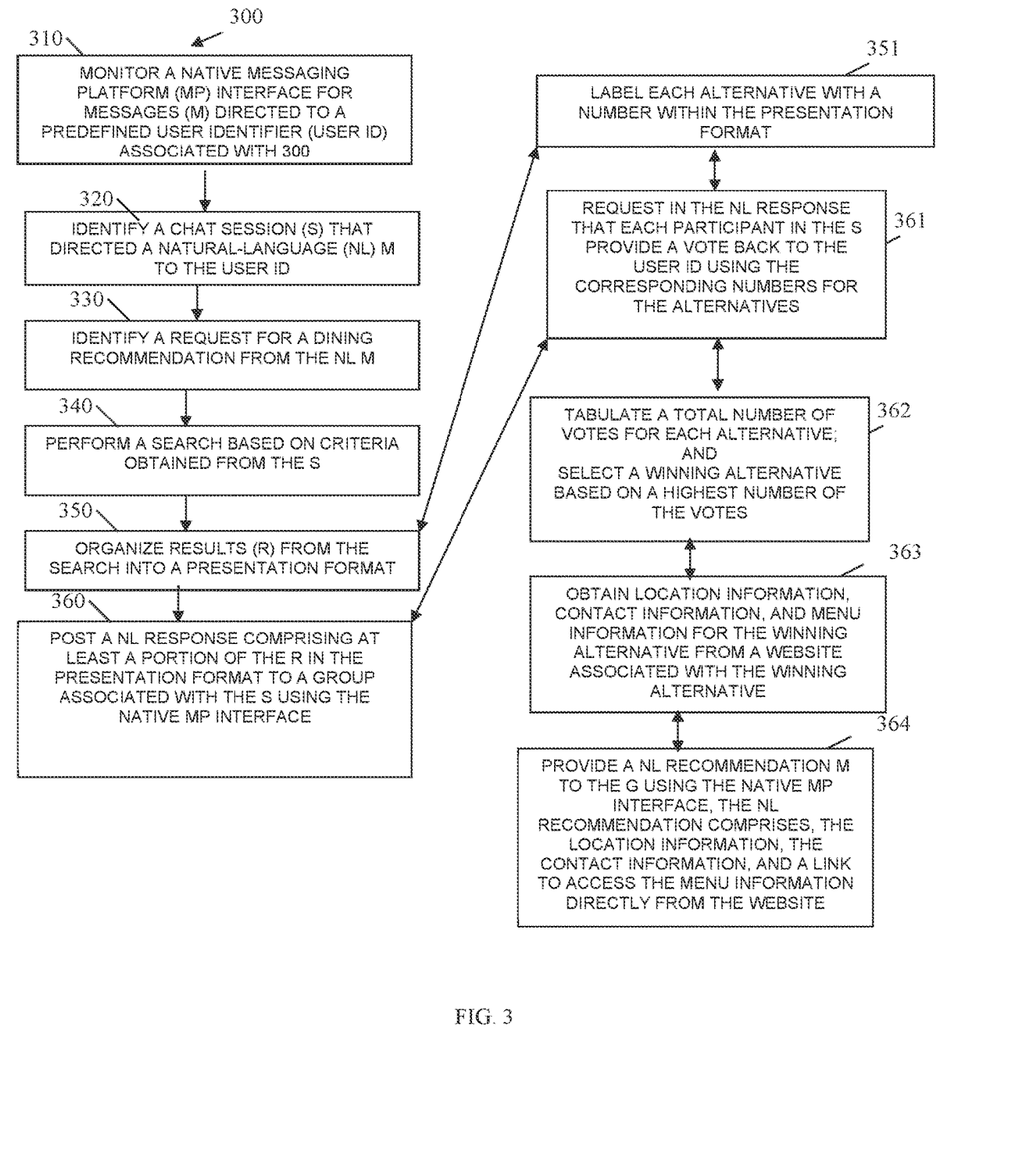
FIG. 3 is a diagram of another method for interacting with a natural language and messaging system integrated group assistant, according to an example embodiment.

FIG. 3 is a diagram of another method 300 for interacting with a natural language and messaging system integrated group assistant, according to an example embodiment. The software module(s) that implements the method 300 is referred to as a "group-based messaging assistant." The group-based messaging assistant is implemented as executable instructions programmed and residing within memory and/or a non-transitory computer-readable (processor-readable) storage medium and executed by one or more hardware processors of one or more hardware devices. The processors of the devices that execute the group-based messaging assistant are specifically configured and programmed to process the group-based messaging assistant. The group-based messaging assistant has access to one or more networks during its processing. The networks can be wired, wireless, or a combination of wired and wireless.

The group-based messaging assistant presents another and, in some ways, an enhanced perspective of the method 200.

In an embodiment, the group-based messaging assistant is some combination of or all of: chatbot 113 and/or the method 200.

In an embodiment, the device that executes the group-based messaging assistant is server 110.

In an embodiment, the device that executes the group-based messaging assistant is cloud 110.

At 310, the group-based messaging assistant monitors a native messaging platform interface for messages being directed to a predefined user identifier associated with the group-based messaging assistant (method 300). The group-based messaging assistant has an account with the messaging platform that the group-based messaging assistant accesses through the native messaging platform interface.

At 320, the group-based messaging assistant identifies a chat session that directed a natural-language messages to the predefined user identifier of the group-based messaging assistant.

At 330, the group-based messaging assistant identifies a request for a dining recommendation from the natural-language message.

At 340, the group-based messaging assistant performs a network search based on criteria obtained from the chat session.

At 350, the group-based messaging assistant organizes results from the network search into a presentation format.

In an embodiment, at 351, the group-based messaging assistant labels each alternative with a number within the presentation format.

At 360, the group-based messaging assistant posts a natural-language response comprising at least a portion of the results in the presentation formation to a group of participants associated with the chat session by using the native messaging platform interface.

In an embodiment of 351 and 360, at 361, the group-based messaging assistant requests in the natural-language response that each participant in the chat session provide a vote back to the predefined user identifier using the corresponding labeled numbers for the alternatives.

In an embodiment of 361, at 362, the group-based messaging assistant tabulates a total number of votes for each alternative and selects a winning alternative based on a highest number of the votes being tabulated for that alternative.

In an embodiment of 362, at 363, the group-based messaging assistant obtains location information, contact information, and menu information for the winning alternative from a website or a website service/resource associated with the winning alternative.

In an embodiment of 363, at 364, the group-based messaging assistant provides a natural-language recommendation message to the group using the native messaging platform interface. The natural-language recommendation message comprises, the location information, the contact information, and a link to access the menu information directly from the website.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   identifying a natural-language message sent to a group of participants within a messaging platform during a chat session;
   resolving a subject of the natural-language message;
   obtaining a lexicon that is specific to the subject;
   determining whether there is a sufficient context for the subject;
   processing an out-of-band action when there is the sufficient context;
   obtaining results of the processing; and
   responding to the group by providing at least a portion results in a natural-language response within the chat session over the messaging platform using the lexicon, wherein responding further includes:
      labeling alternatives associated with the results with a number;
      requesting that each participant in the group respond in the chat session with a vote corresponding to the numbers labeled with the alternatives;
      tabulating the votes received in response messages from the participants;
      identifying a winning alternative based on a highest number of votes from the response messages;
      accessing a website associated with the winning alternative and obtaining location information, contact information, and menu information; and
      sending the location information, the contact information, and a link to the menu information on the website to the group within the messaging platform to the group as detailed information associated with the winning alternative.

2. The method of claim 1, wherein receiving further includes receiving the natural-language message through a native messaging platform interface associated with the messaging platform.

3. The method of claim 1, wherein receiving further includes receiving the natural-language message based on the natural-language message being tagged by a participant of the group with a messaging platform user identifier that is associated with the method.

4. The method of claim 1, wherein resolving further includes resolving the subject based on a topic associated with the method.

5. The method of claim 4, wherein determining further includes determining that there is an insufficient context based on the topic.

6. The method of claim 5, wherein determining further includes posting a natural-language question based on the insufficient context to the group to obtain the sufficient context from at least one participant response message that is provided based on the posting of the natural-language question.

7. The method of claim 6, wherein posting further includes iterating the posting with additional natural-language questions until the sufficient context is resolved in a most-recent participant response message.

8. The method of claim 7, wherein processing further includes processing a network search using criteria identified for the topic from the natural-language message and other natural-language messages received from the participants during the chat session.

9. The method of claim 8, wherein obtaining further includes sorting and ranking the results based on the criteria.

10. A method, comprising:
   monitoring a native messaging platform interface for messages directed to a predefined user identifier associated with the method;
   identifying a chat session that directed a natural-language message to the predefined user identifier;
   identifying a request for a dining recommendation from the natural-language message;
   obtaining a lexicon specific to dining recommendations;
   performing a search based on criteria obtained from the chat session;
   organizing results from the search into a presentation format;
   posting a natural-language response comprising at least a portion of the results in the presentation format to a group associated with the chat session using the native messaging platform interface and using the lexicon;
   wherein posting further includes:
      labeling alternatives in the results with a number;
      requesting that each participant in the group respond in the chat session with a vote corresponding to the numbers labeled with the alternatives;
      tabulating the votes received in response messages;
      identifying a winning alternative based on a highest number of votes;

accessing a website associated with the winning alternative and obtaining location information, contact information, and menu information; and sending the location information, the contact information, and a link to the menu information on the website to the group using the native messaging platform interface as detailed information associated with the winning alternative.

11. A system, comprising:

at least one server comprising a processor and a non-transitory computer-readable storage medium;

the non-transitory computer-readable storage medium comprising executable instructions;

the executable instructions when executed by the processor from the non-transitory computer-readable storage medium cause the processor to perform operations comprising:

actively participating in chat session of a messaging platform using a native messaging platform interface;

identifying messages directed to group decision on a subject;

obtaining a lexicon specific to the subject;

performing out-of-band searching on criteria defined in the messages for the subject and the decision;

obtaining results from resources searched during the out-of-band searching;

filtering and organizing the results as summary results based on the criteria;

sending a response message comprising the summary results to the group using the native messaging platform interface and using the lexicon; and     labeling each alternative in the summary results with a number;

requesting within the response message that each participant of the group respond in the chat session with a vote corresponding to the numbers labeled with the alternatives;

tabulating the votes received in the response messages;

identifying a winning alternative based on a highest number of votes;

accessing a website associated with the winning alternative and obtaining location information, contact information, and menu information; and     sending the location information, the contact information, and a link to the menu information on the website to the group using the native messaging platform interface as detailed information associated with the winning alternative.

\* \* \* \* \*